April 28, 1942. C. M. VAN AUKEN 2,281,215
GRILLE GUARD
Filed March 18, 1940
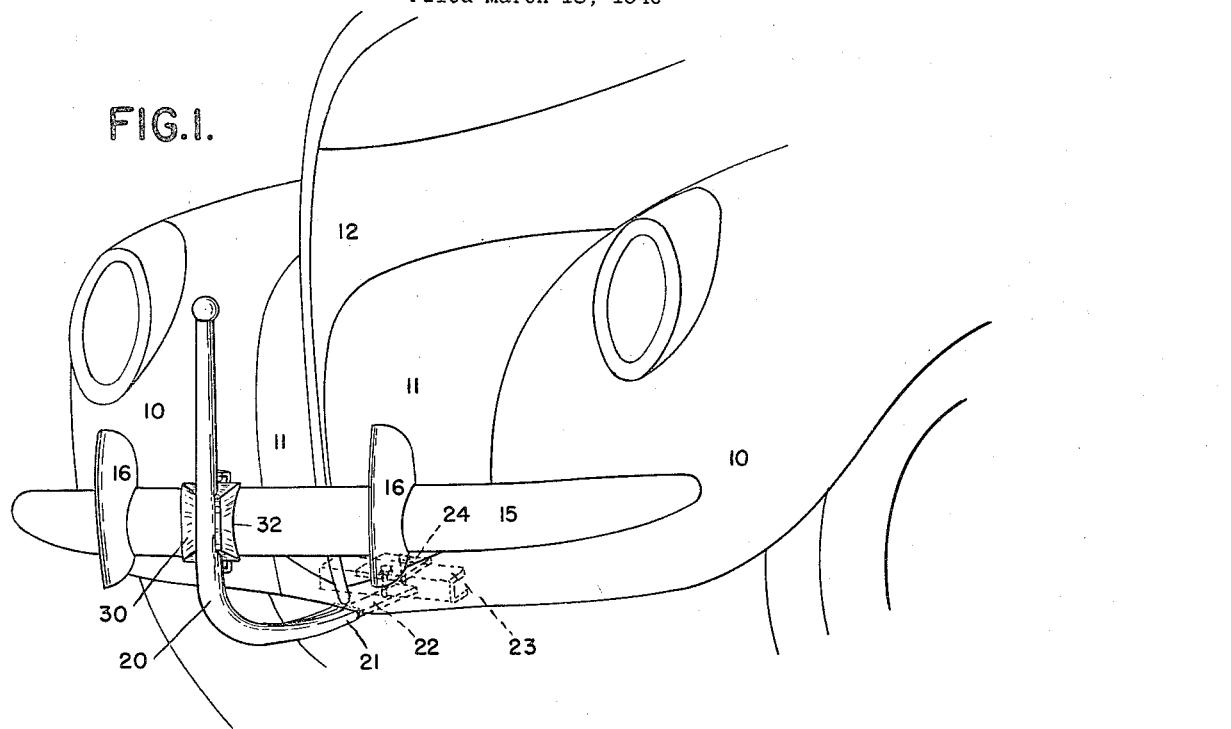
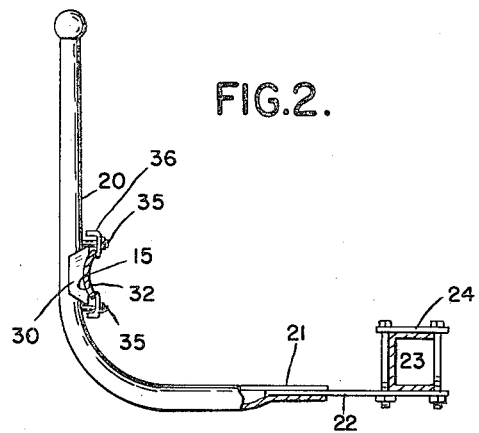
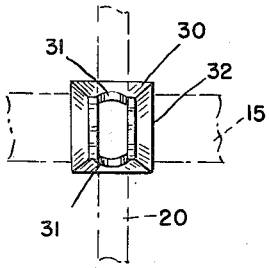
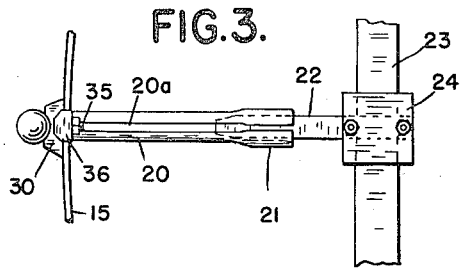
INVENTOR.
CHARLES M. VAN AUKEN
BY *Swan, Frye, & Hardesty*
ATTORNEYS Patented Apr. 28, 1942

2,281,215

UNITED STATES PATENT OFFICE 2,281,215

GRILLE GUARD

Charles M. Van Auken, Highland Park, Mich.

Application March 18, 1940, Serial No. 324,475

2 Claims. (Cl. 293—55)

The present invention relates to guard devices for the front end grilles or radiation of automobiles.

In the present day automobile, the usual construction involves placing at the front end of the vehicle an ornamental grille which covers the more or less unsightly radiator but permits air access thereto, and, in addition to the grille, some vehicles have sheet metal parts to add to the appearance and for other purposes.

All of this front end construction is susceptible of easy breakage and consequently, in addition to the usual bumper or fender, various devices have been made for the purpose of preventing the extending parts of other vehicles passing over these bumpers and damaging the easily damaged parts. Most of these devices are not successful due to the fact that the bumpers themselves, while sufficiently stiff to withstand direct blows are not sufficiently rigid to resist being twisted by the commonly used vertical cross member, when the blow or thrust is applied to, for example, the upper end of the member.

The present invention, therefore, has among its objects a grille guard which will overcome the difficulties heretofore experienced and provide against passage of the extending parts of other vehicles over the bumper and damaging the above mentioned structure.

Another object is a device which permits a limited direct backward movement of the bumper but prevents twisting the latter when force is applied above or below the bumper.

Other objects will readily occur to those skilled in the art upon reference to the following description and the accompanying drawing in which Figure 1 is a perspective view of the front end of an automobile showing a bumper, and a device of the present invention.

Figure 2 is a side elevation of the guard but showing parts in section.

Figure 3 is a top plan view of the parts shown in Figure 2.

Figure 4 is a perspective view of a detail.

In the drawing, the front end of an automobile is shown with the fenders at 10, the radiator grilles at 11, and front sheet metal construction at 12. All of these parts are of easily damaged character and commonly protected to some extent by a bumper 15, which is provided with a pair of vertically arranged cross members 16 intended to prevent the bumpers of other vehicles pasing over or under the bumper 15.

As stated above, however, because of the insufficient rigidity of the bumper 15, it frequently happens that another bumper, in striking the upper end of a member 16, will push this back, while twisting the bumper 15, and act as a skid to actually aid the other bumper in passing over the bumper 15.

The present device, designed to prevent such result, consists of a rigid, rounded channel member 20 fixed to bumper 15, preferably in front thereof, and curved backwardly under the bumper and receiving in its open end 21 the end of a flat spring member 22, the other end of which is fixed rigidly to a suitable vehicle frame member 23 by means of the clamp pins and bolts indicated as a whole at 24.

At the point where the member 20 is fixed to bumper 15, there is provided a suitable saddle piece 30 having on one face suitably curved seats 31 for a member 20 and on its opposite face seats 32 suitably shaped to conform with the face of the bumper 15.

The member 20, the saddle piece 30 and the bumper 15 are clamped tightly together by two bolts 35 whose heads lie in the channel member 20 and which extend through the plates 36 arranged to overlie the edges of bumper 15. Suitable nuts on the bolts 35 enable the fixing together of these parts.

In order to prevent lateral play between member 20 and spring 22, and permit the use of a larger spring, the rear end 21 of member 20 is preferably flattened as indicated and these parts so fitted as to permit their relative movement.

While a slotted tube might be used for making member 20, it is preferred to roll up a strip of suitable flat stock and leave the edges separated a short distance to provide a continuous opening 20a the entire length of the member. By this means adjustment of the positions of bolts 35 may be made to take care of any variation in the height or location of the bumper. It also permits the installation of the bumper in either an upright or somewhat inclined position.

The operation of the device is easily understood: For example, if the thrust against member 20 is in line with the bumper 15, the slip joint 21—22 permits a limited movement directly backward. If the thrust is above or below the bumper, its tendency to swing the member 20 around the bumper 15 is restricted by the spring 22 anchored to frame member 23.

Now having described the invention and its preferred form of embodiment, what is claimed is:

1. In combination with the horizontally arranged bumper of a vehicle, a substantially rigid hollow member fixed in an upright position to said bumper and having its lower end portion extending backward toward said vehicle, and a relatively stiff resilient member fixed to the vehicle frame and extending forward and into the end of said backwardly extending lower portion.

2. A grille guard for a vehicle having a horizontal bumper consisting of a substantially rigid rounded channel member having its edges turned inwardly, a saddle member contoured to fit said channel member and said bumper and provide for the rigid attachment of the channel member to said bumper in angular relation, means slidable in said channel for clamping together the bumper, saddle and channel member, and a stiff spring member adapted to be fixed to the vehicle and to cooperate with said channel member to prevent the latter from tilting.

CHARLES M. VAN AUKEN.